United States Patent

Sakamoto et al.

[11] Patent Number: 6,107,448
[45] Date of Patent: Aug. 22, 2000

[54] AROMATIC POLYCARBODIIMIDE AND FILMS THEREOF

[75] Inventors: Michie Sakamoto; Takahiro Fukuoka; Masahiro Yoshioka; Amane Mochizuki, all of Osaka, Japan

[73] Assignee: Nitto Denko Corporation, Osaka, Japan

[21] Appl. No.: 09/194,010

[22] PCT Filed: Mar. 18, 1998

[86] PCT No.: PCT/JP98/01164

§ 371 Date: Nov. 19, 1998

§ 102(e) Date: Nov. 19, 1998

[87] PCT Pub. No.: WO98/41551

PCT Pub. Date: Sep. 24, 1998

[30] Foreign Application Priority Data

Mar. 19, 1997 [JP] Japan .................................. 9-085730

[51] Int. Cl.[7] .................................................. C07C 331/00
[52] U.S. Cl. ............................................................ 528/310
[58] Field of Search ...................................... 528/196, 310

[56] References Cited

U.S. PATENT DOCUMENTS 5,866,715  2/1999  Tsai ........................................... 560/302

*Primary Examiner*—Terressa Mosley
*Attorney, Agent, or Firm*—Sughrue, Mion, Zinn, Macpeak & Seas, PLLC

[57] ABSTRACT

An aromatic polycarbodiimide having a structural repeating unit represented by the following formula (I):

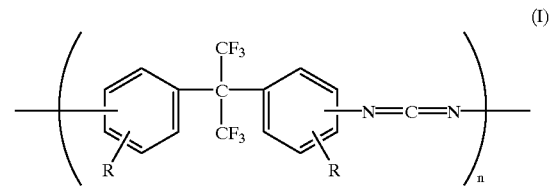

wherein R represents a hydrogen atom or an alkyl group and n is an integer of 3 to 600,
which has excellent solubility and heat resistance and also has excellent adhesion, low-temperature workability and moisture resistance, is provided.

5 Claims, 2 Drawing Sheets

AROMATIC POLYCARBODIIMIDE AND FILMS THEREOF

TECHNICAL FIELD

The present invention relates to a novel aromatic polycarbodiimide. The aromatic polycarbodiimide of the present invention provides films, adhesives, and moldings having various excellent characteristics such as a high heat resistance, etc.

BACKGROUND ART

Conventional aromatic polycarbodiimides are obtained by using diphenylmethane diisocynate (MDI), tolylene diisocyanate (TDI), etc., as a monomer, and polymerizing this. Such a polycarbodiimide is used as a flameproofing film and a heat resistant adhesive due to its excellent heat resistance.

However, such a conventional polycarbodiimide film is poor in the solubility, is gelled and deposited as solids with increasing its molecular weight, whereby a sufficiently high molecular weight polymer is not obtained. Further, the polycarbodiimide film has a heat resistance in the point that even when the film is exposed to high temperature of 400° C. or more, a volatile gas and decomposed monomers are not formed, but when the film is heat-treated at a temperature of 200° C. or higher, the film loses the self-supporting property and becomes brittle, whereby the film cannot endure the practical use. Furthermore, when the film is heat-adhered to an adherend such as a copper foil, etc., it cannot say that the adhesive force is sufficient.

DISCLOSURE OF INVENTION

Figure 1:
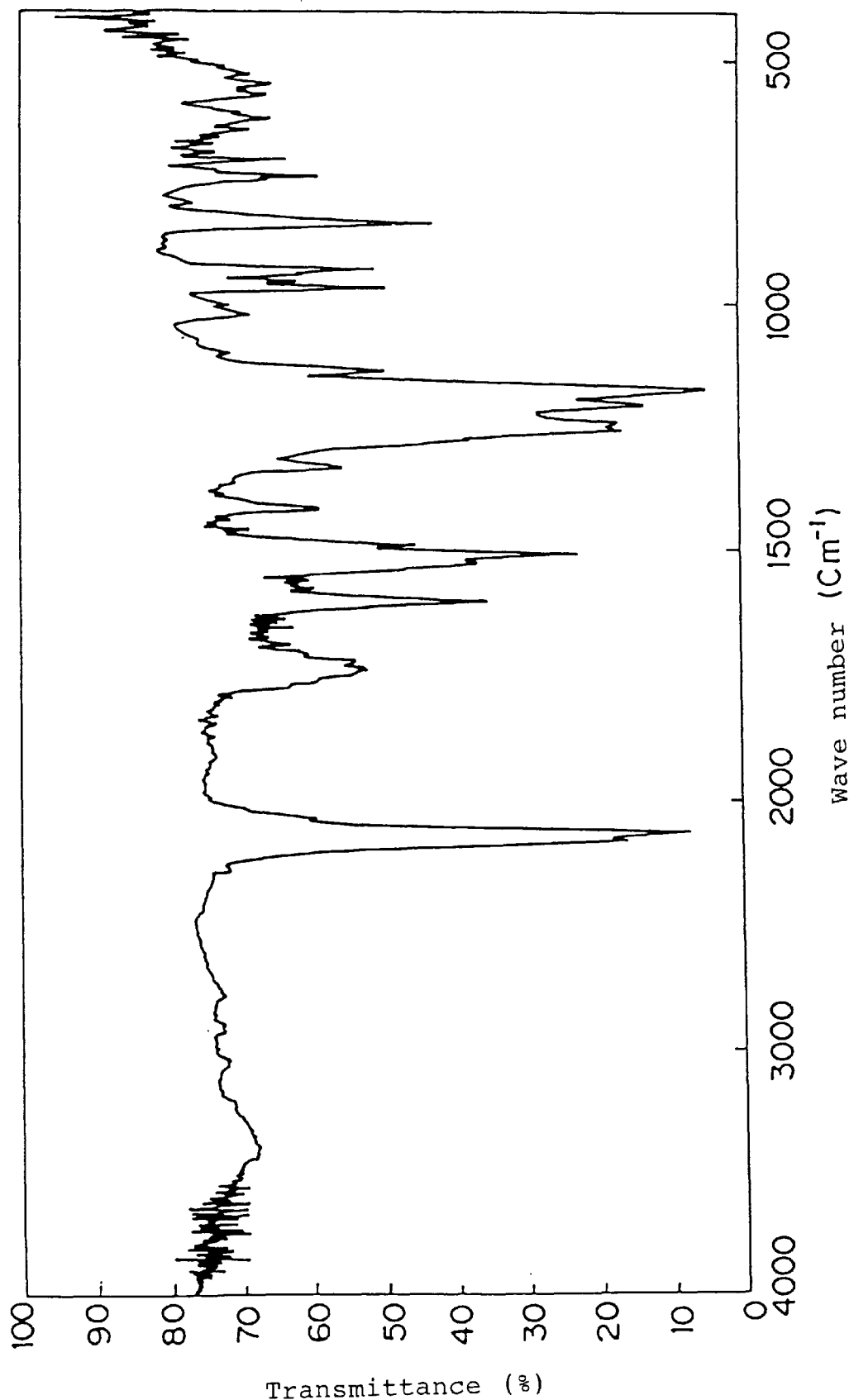
FIG. 1 is a graph showing an infrared absorption spectrum of the polymer obtained in Example 1.

As a result of making various investigations for solving these problems of such a conventional polycarbodiimide, the present inventors have succeeded to obtain the novel aromatic polycarbodiimide of the present invention.

That is, the present invention provides an aromatic polycarbodiimide having a structural repeating unit represented by the following formula (I):

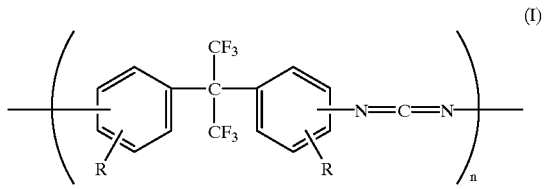

wherein R represents a hydrogen atom or an alkyl group (having 1 to 5 carbon atoms, and preferably 1 to 3 carbon atoms) and n is an integer of 3 to 600.

In the formula (I), R represents particularly preferably a hydrogen atom or a methyl group and the bonding position thereof is m- or p-position of a hexafluoroiso-propylidene group.

Also, the present invention provides an organic solvent solution thereof and a film thereof. In the present specification, the term "film" means a film-formed form of the polymer and includes a so-called sheet. The polymer of the present invention is a novel high molecular weight compound, has a very high heat resistance together with an excellent solubility, and also is excellent in the adhesive property, a low-temperature workability, and a moisture resistance.

BEST MODE FOR CARRYING OUT THE INVENTION

The polycarbodiimide of the present invention is obtained by polymerizing a corresponding diisocyanate represented by the following formula (II) as a monomer in the presence of a phosphorus-based catalyst by a conventional method:

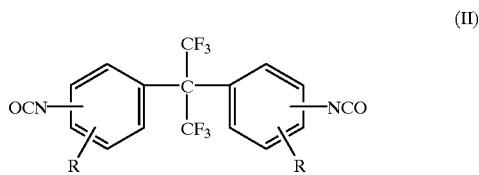

The typical examples of such a diisocyanate include those represented by the following formulae (IIa) and (IIb):

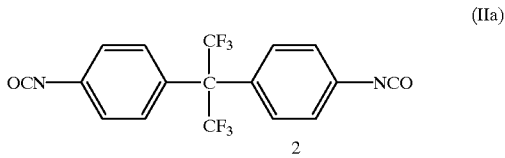

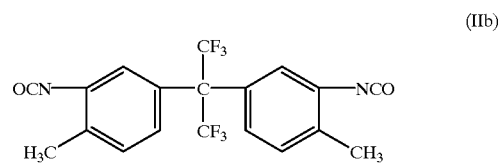

The above-described compound (IIb) is a novel substance. Also, the above-described compound (IIa) is a known substance, and as a literature about the production method of the compound (IIa) and about a production method of a polyurethane using the compound (IIa), there is Andrianov, et al., *Vysokomol, Soedin.*, Ser. B, 20(6), 471, (1978), etc., but there is no description therein about the production of a polycarbodiimide from the compound (IIa).

(Monomer)

The diisocyanate compound (the above-described formula (II)) which is the raw material for the polycarbodiimide of the present invention can be produced by forming an isocyanate from a corresponding diamine represented by the following formula (III), which is the precursor thereof:

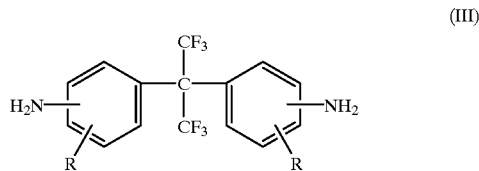

wherein is the same as described above, by various known methods.

A method of forming an isocyanate from such a diamine compound includes a method of reacting the diamine compound with phosgene, diphenyl carbonate, or carbonyl diimidazole. Also, another method is that the diamine compound is converted to an urethane using a halogenated alkyl formate or a halogenated aryl formate and then the isocyanate may be formed from the urethane in the presence of an activating agent such as chlorosilane, catechol borane, etc.

Furthermore, as a still another method, a method of using a carboxylic acid represented by the following formula (IV) as a precursor for the diisocyanate:

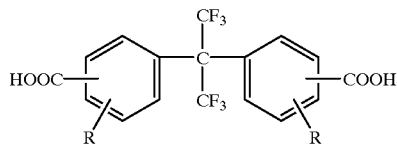

(IV)

wherein R is the same as described above, and forming the isocyanate from the carboxylic acid by a Curtius decomposition may be used.

In these production methods, a method of once forming a urethane from the diamine compound using halogenated alkyl formate or halogenated aryl formate and then forming the isocyanate from the urethane using chlorosilane as an activating agent (G Greber, et al., *Angew. Chem. Int. Ed.*, Vol. 17, No. 12, 941(1968)) or a method of forming the isocyanate using a catechol borane (V. L. K. Valli, et al., *J. Org. Chem.* Vol. 60, 257(1997)) is preferred in the points of the yield and the safety. This method is described in detail below.

(Urethane Synthesis)

First, an urethane is synthesized by reacting the corresponding diamine compound (formula III) with methyl chloroformate, ethyl chloroformate, phenyl chloroformate, p-nitrophenylchloroformate, etc. The diamine compound, which can be used as the raw material, practically includes 2,2-bis(4-aminophenyl)hexafluoropropane represented by the following formula (IIIa):

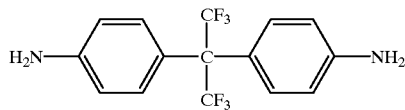

(IIIa)

2,2-bis(3-amino-4-methylphenyl)hexafluoropropane represented by the following formula (IIIb):

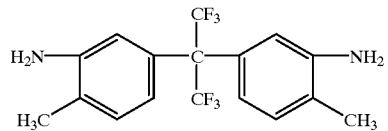

(IIIb)

and the like.

Further, to smoothly proceed the formation of isocyanate, phenyl chloroformate or p-nitrophenyl chloroformate is suitable. However, since p-nitrophenyl chloroformate has a too higher activity and has a possibility of causing many side reactions, phenyl chloroformate is most preferred. The amount of those chloroformates used is 1.5 to 4.0 mol times, preferably 1.6 to 3.8 mol times, and most preferably 1.8 to 3.6 mol times, the mol number of the diamine.

The solvent used for the reaction may be any solvents which dissolve the diamine. Examples of the solvent include ether-based compounds such as THF, dioxane, diethyl ether, etc.; aromatic hydrocarbon compounds such as toluene, xylene, benzene, etc.; ketone-based compounds such as acetone, methyl ethyl ketone, etc.; and ester-based compounds such as ethyl acetate, etc. These solvents may be used singly or as a mixture of two or more kinds thereof.

The reaction temperature is −40° C. to 100° C., preferably −20° C. to 80° C., and most preferably 0° C. to 60° C. If the reaction temperature is lower than −40° C., the reaction is reluctant to proceed, and if the reaction temperature exceeds 100° C., there is a possibility of causing side reactions such as a condensation.

A base for trapping hydrogen chloride formed by the reaction may be any bases which do not hinder the reaction and can be dissolved in the solvent used. Examples thereof include triethylamine, sodium hydroxide, pyridine, and diazabicyclo-undecene (DBU). The amount of the base used is 1.5 to 4.0 times, and preferably 1.8 to 3.5 times, the mol number of the diamine used.

To purify the urethane obtained, a conventionally known method such as a recrystallization, a column, etc., can be used. Also, if necessary, a distillation may be carried out.

(a) Isocyanation using chlorosilane

For isocyanating the urethane using a chlorosilane, the urethane is thermally decomposed using a chlorosilane of 1.5 to 4.6 times, preferably 1.6 to 4.0 times, and most preferably 1.8 to 3.5 times, the mol amount of the urethane, as a catalyst.

As the chlorosilanes, trimethyl chlorosilane, triethyl chlorosilane, trimethoxychlorosilane, dimethyl dichlorosilane, methyl trichlorosilane, dichlorosilane, trichlorosilane, tetrachlorosilane, etc., are used. Of those, trimethyl chlorosilane is suitable in the points of the ease for handling and the cost.

The solvent used may be a solvent which dissolves or suspends the urethane, and there are the ether-based compounds and the aromatic hydrocarbons as described above, and halogenated hydrocarbons. These solvents may be used singly or as a mixture thereof. Further, as the case may be, the reaction temperature can be changed by replacing a part or the whole of the solvent with other solvent during the reaction.

The reaction temperature is from 0° C. to the boiling point of the solvent used, and preferably from room temperature to the boiling point. If the reaction temperature is too low, it sometimes happens that the reaction does not proceed. On the other hand, if the reaction temperature is raised too high or the reaction system is heated for a too long time, the reaction product is sometimes decomposed. Accordingly, it is better to gradually raise the temperature while tracing the reaction by IR, etc.

A base for trapping hydrogen chloride formed at the reaction is the same base as used at the formation of the urethane described above, and the amount thereof used is also same as described above.

(b) Isocyanation using halogenated catechol borane

For isocyanating the urethane, a method of using a halogenated catechol borane as an activating agent in place of the above-described chlorosilane may be employed. The halogenated catechol borane includes chlorocatechol borane, bromocatechol borane, etc., but chlorocatechol borane is preferred in the points of the ease for handling and the cost. The amount thereof used is the same as in the above-described case of the chlorosilane. Since the catechol borane has a higher activity for the thermal decomposition of the urethane than the chlorosilanes, urethanes other than phenyl urethane can be used.

A reaction solvent, which dissolves or suspends the urethane, can be used, and the same solvents as in the case of isocyanation using the chlorosilane described above may be used. These solvents may be used singly or as a mixture of two or more kinds thereof. Further, as the case may be, the reaction temperature can be changed by replacing a part or the whole of the solvent with other solvent during the reaction.

The reaction temperature is generally −50° C. to 80° C., preferably −20° C. to 60° C., and more preferably 0° C. to 40° C., and the temperature differs according to the urethane used. If the reaction temperature is too low, it sometimes happens that the reaction does not proceed. On the other hand, if the reaction temperature is raised too high or the reaction system is heated for a too long time, the reaction product is sometimes decomposed. Accordingly, it is better to gradually raise the temperature while tracing the reaction by IR, etc. A base is used for trapping hydrogen chloride formed at the reaction, similar to the case as described above.

After the reaction, the diisocyanate monomer obtained can be purified by removing the solvent and conducting a flash column, a recrystallization, or a vacuum distillation.

(Production of polycarbodiimide)

To produce the polycarbodiimide using the above-described diisocyanate, the diisocyanate monomer may be used singly or may be copolymerized with other organic diisocyanate such as 4,4'-diphenylmethane diisocyanate, 2,6-tolylene diisocyanate, 2,4-tolylene diisocyanate, 1-methoxyphenyl-2,4-diisocyanate, 3,3'-dimethoxy-4,4'-diphenylmethane diisocyanate, 4,4'-diphenyl ether diisocyanate, 3,3'-dimethyl-4,4'-diphenyl ether diisocyanate, and o-tolylene diisocyanate, in the range of not reducing the property thereof, that is, in the range of 50 mol % or less.

The polymerization temperature is preferably 40 to 150° C., and more preferably 50 to 140° C. If the reaction temperature is lower than 40° C., the reaction time becomes too long, which is not practical. Further, if the temperature exceeds 150° C., it is difficult to select a solvent usable for the reaction temperature.

The concentration of the diisocyanate in the synthesis of the polycarbodiimide is 2 to 50% by weight (hereinafter referred to as "%" for simplicity), preferably 5 to 45%, and most preferably 15 to 40%. If the concentration is lower than 2%, carbodiimidization does not sometimes proceed. Further, if the concentration exceeds 60%, there is a possibility that the control of the reaction becomes difficult.

The organic solvent used in the synthesis of the polycarbodiimide and for the polycarbodiimide solution may be conventionally known one in such a reaction. Specifically, there are halogenated hydrocarbons such as tetrachloroethylene, 1,2-dichloroethane, chloroform, etc.; ketone-based solvents such as acetone, methyl ethyl ketone, methyl isobutyl ketone, cyclohexanone, etc.; cyclic ether-based solvents such as tetrahydrofuran, dioxane, etc.; and aromatic hydrocarbon-based solvents such as toluene, xylene, benzene, etc. These solvents may be used singly or as a mixture of two or more kinds thereof. Further, a part or the whole of the solvent may be replaced with other solvent during the reaction.

As the catalyst used for the carbodiimidization, known phosphorus-based catalysts are properly used, and examples of such a catalyst include 1-phenyl-2-phospholene-1-oxide, 3-methyl-2-phospholene-1-oxide, 1-ethyl-2-phospholene-1-oxide, 3-methyl-1-phenyl-2-phospholene-1-oxide, and the phospholene oxides such as the 3-phospholene isomers of them.

Polymers may be endcapped by adding a monoisocyanate at the end stage, the middle stage, or the initial stage of the polymerization reaction or over the entire polymerization reaction. As such a monoisocyanate, an aromatic monoisocyanate such as phenyl isocyanate, p-nitrophenyl isocyanate, p- or m-tolyl isocyanate, p-formylphenyl isocyanate, p-isopropylphenyl isocyanate, etc., can be used. The polycarbodiimide solution obtained in this way is excellent in the storage stability.

Further, after completion of the reaction, the reaction mixture may be poured to a poor solvent such as methanol, ethanol, isopropyl alcohol, hexane, etc., to deposit the polycarbodiimide as the precipitates, and the unreacted monomer and the catalyst may be removed. By conducting such an operation, the solution stability of the carbodiimide can be improved.

To prepare the solution of the polycarbodiimide, after depositing the polymer as the precipitates, the precipitates are collected, washed by a definite operation, dried, and dissolved again in an organic solvent.

The polymer solution may be purified by adsorbing by-products contained in the polymer solution onto an adsorbent. As the adsorbent, for example, an alumina gel, a silica gel, active carbon, zeolite, active magnesium oxide, active bauxite, fuller's earth, active clay, and molecular sieve carbon can be used singly or as a mixture of them.

The molecular weight of the polycarbodiimide is 1,000 to 200,000, and preferably 2,000 to 100,000, in terms of a number average molecular weight. That is, in the above-described formula (I), n is an integer of 3 to 600, and preferably 6 to 300. If the molecular weight of the polycarbodiimide is too high, when the polymer is allowed to stand at normal temperature for from several minutes to several hours, the polymer is easily gelled, which is undesirable. Further, if the molecular weight is too low, the polymer is undesirable lacking in the reliability of the film thereof.

(Production of film or adhesive sheet)

The polycarbodiimide film (or sheet) of the present invention is obtained by forming a film (or sheet) of the polycarbodiimide varnish in an appropriate thickness using a known method such as casting, spin coating, roll coating, etc. This film is usually only dried at a temperature necessary for removing the solvent, and can be dried at a temperature of, for example, 30 to 300° C. In particular, to dry the film without proceeding the curing reaction too much, the temperature of 50 to 250° C. is preferred. If the drying temperature is lower than 30° C., the solvent remains in the film, whereby the reliability of the film becomes undesirably poor. Further, if the drying temperature is higher than 300° C., crosslinking of the polycarbodiimide resin proceeds and there is a possibility that the film becomes undesirably unsuitable for practical use in the point of the strength, etc.

The polycarbodiimide resin composition of the present invention may be compounded with a fine inorganic filler in the range of not reducing the workability and the heat resistance. Also, to obtain the surface smoothness, if necessary, various kinds of additives such as a smoothing agent, a leveling agent, a defoaming agent, etc., may be added to the composition.

A molded product obtained by molding the polymer of the present invention into a film form can be used as a heat-resistant adhesive sheet. The sheet thickness which can be molded in the film or the adhesive sheet is generally 1 to 2,000 μm, but the thickness is not limited to the range and can be appropriately selected according to the purpose. Further, the form and the size of the sheet can appropriately be selected according to the adherend such as a lead frame, a semiconductor chip, etc.

In the case of producing the adhesive sheet, for the purposes of imparting an electric conductivity, improving the heat conductivity, controlling the modulus of elasticity, and particularly obtaining a high modulus of elasticity, if necessary, various inorganic powders made up of metals such as aluminum, copper, silver, gold, nickel, chromium, lead, tin, zinc, palladium, soft solder, etc.; ceramics such as alumina, silica, magnesia, silicon nitride, etc.; carbon, etc., can be compounded singly or as a mixture of two or more kinds thereof.

Further, these films may formed on a support to form a multilayer adhesive sheet. To produce the adhesive sheet of such a structure, varnishes may be coated on a support or the films are previously prepared, and the adhesive sheet may be produced by laminating these sheets by pressing, etc.

The support used in this case is a metal foil, an insulating film, etc. The metal foil used includes the films of aluminum, copper, silver, gold, nickel, indium, chromium, lead, tin, zinc, palladium, etc., and those can be used singly or as an alloy thereof. The insulting film includes the films of polyimide, polyesters, polyethylene terephthalate, etc., that is, the films having a heat resistance and a chemical resistance can be used.

The metal foil and the insulating film may be used singly or may be used as a laminate of two or more layers of them, for example, as a two layer substrate of a metal foil/an insulating film, etc. Such a two layer substrate is, for example, a copper/polyimide two layer substrate.

The sheet-form adhesive of the present invention is heat-cured by a heat treatment to show a strong adhesive force and also become a cured product having a low hygroscopic property. To carry out the heat treatment, an appropriate method such as a heater, ultrasonic waves, high frequency, ultraviolet rays, etc., may be used. Accordingly, the adhesive sheet of the present invention is preferably used for the adhering treatment of various materials, and particularly preferably used for the fixing treatment of electric and electronic parts such as semiconductor chips and lead frames, requiring the fixing treatment having a high reliability and thus requiring that the adhesive sheet has a low hygroscopic property. The adhesive sheet of the present invention is excellent in the points that the adhesive sheet has a low hygroscopic property, has a good flexibility, resulting in easy handling, has a good adhesion to semiconductor elements, and has a good storage stability.

The above-described urethane formation of the diamine, isocyanation and carbodiimidization may proceed stepwise by conducting isolation and purification in the respective step, or those steps may be carried out as a series of reactions in one reaction vessel, The present invention is more practically explained by the following examples and comparative examples. The properties of the polycarbodiimide obtained are measured as follows.

Molecular weight

Measured using HL8020 manufactured by TOSOH CORPORATION, and THF as a developing solvent, and calculating in a polystyrene standard conversion.

IR

Measured using FT/IR-230 manufactured by JEOL LTD.

Heat curing temperature

Measured using DSC-200 manufactured by Seiko Instruments Inc., and an exothermic peak of a trimerization was defined as the heat curing temperature.

Glass transition temperature (Tg)

Measured using TMA/SS100 manufactured by Seiko Instrument Inc., while raising the temperature from room temperature to 400° C. at a rate of 10° C./minute.

Thermal decomposition initiating temperature (Td)

Measured using TG/DTA300 manufactured by Seiko Instrument Inc.

[EXAMPLE 1]

In a three-necked flask (300 ml) were placed 5.0 g (15.0 mmols) of 2,2-bis(4-aminophenyl)hexafluoropropane, 120 ml of dichloromethane, and 3.0 g (30.0 mmols) of triethylamine. The flask was ice-cooled and 4.7 g (30.0 mmols) of phenyl chloroformate was added to the mixture under an nitrogen gas atmosphere. After stirring the mixture for 15 minutes, the reaction mixture was wormed to room temperature and stirred overnight. 3.0 g (30.0 mmols) of triethylamine and then 3.3 g (30.0 mmols) of trimethylchlorosilane were added to the flask at room temperature, and the resulting mixture was stirred for 45 minutes. 100 ml of toluene was added thereto, and while gradually raising the reaction temperature to 80° C., the mixture was stirred for 5.5 hours. During this step, dichloromethane was almost distilled off. After filtering off triethylamine hydrochloride formed by the reaction, 540 mg (2.8 mmols) of a carbodiimidization catalyst (3-methyl-1-phenyl-2-phospholene-1-oxide) was added, followed by stirring for 3 hours at 80° C. After confirming the carbodiimidization by IR (FIG. 1), the polymer solution was added to 3 liters of hexane, and deposited solids were collected and dried at 30° C. for 12 hours under a reduced pressure to obtain a polymer having Mn=2,400 in a yield of 89%.

The polymer was again dissolved in cyclohexanone, and the solution was cast on a copper foil of 35 μm in thickness and dried at 200° C. for 20 minutes to obtain an adhesive sheet. The copper foil of the sheet was removed by etching with an aqueous solution of iron chloride to obtain a film having a thickness of 20 μm, a heat-curing temperature above 400° C., Tg=220° C. and Td=490° C. Even when this film was further dried at 200° C. for 60 minutes, the film yet had a flexibility.

[EXAMPLE 2]

The copper/polycarbodiimide adhesive sheet obtained in Example 1 was adhered to a 42 alloy plate and they were pressed at 350° C. for 1 second under a pressure of 50 kg/cm$^2$. As a result of measuring the adhesive force, it showed an adhesive force of 1200 g/cm. An adhesive force after placing this in a constant-temperature and constant-humidity chamber of 80° C./90% RH for 168 hours was 1000 g/cm.

[EXAMPLE 3]

In a three-necked flask (300 ml) were placed 5.0 g (13.7 mmols) of 2,2-bis(3-amino-4-methylphenyl) hexafluoropropane, 100 ml of toluene, and 2.8 g (27.5 mmols) of triethylamine. The flask was ice-cooled and 4.3 g (27.5 mmols) of phenyl chloroformate was added thereto under a nitrogen gas atmosphere. After stirring the mixture for 30 minutes, the reaction mixture was wormed to room temperature and stirred overnight.

Figure 2:
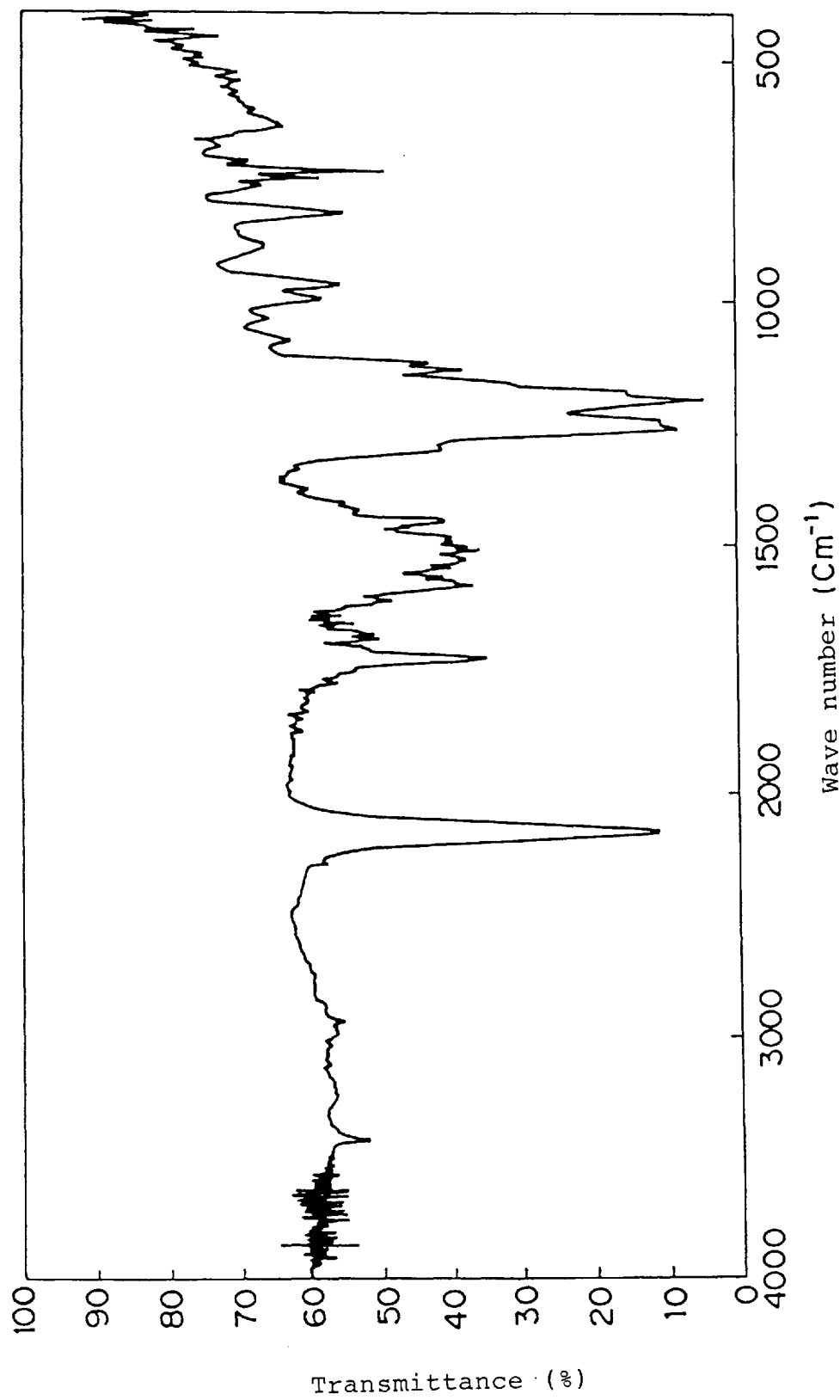
FIG. 2 is a graph showing an infrared absorption spectrum of the polymer obtained in Example 3.

At room temperature, 2.8 g (27.5 mmols) of triethylamine and 3.0 g (27.5 mmols) of trimethylchlorosilane were added to the flask, followed by stirring for 1 hour. While gradually raising the reaction temperature to 80° C., the mixture was stirred for 5 hours. 500 mg (2.6 mmols) of a carbodiimidization catalyst (3-methyl-1-phenyl-2-phospholene-1-oxide) was then added thereto, followed by stirring at 80° C. for 2 hours. After confirming the carbodiimidization by IR (FIG. 2), triethylamine hydrochloride formed was filtered off. The polymer solution obtained was then poured to 4 liters of hexane, and the solids deposited were collected and dried at 30° C. for 12 hours under reduced pressure to obtain a polymer having an Mn=4,600 in a yield of 70%.

The polymer was again dissolved in toluene and the solution was cast on a copper foil of 35 μm in thickness and dried at 200° C. for 20 minutes to form an adhesive sheet. The copper foil of the sheet was etched with an aqueous solution of iron chloride to obtain a film having a thickness of 17 μm, a heat-curing temperature above 400° C., Tg=160° C. and Td=460° C. Even when this film was further dried at 200° C. for 60 minutes, the film yet had a flexibility.

[EXAMPLE 4]

The copper/carbodiimide adhesive sheet obtained in Example 3 was adhered to a 42 alloy plate and they were pressed at 350° C. for 1 second under a pressure of 50 kg/cm² to laminate them. As a result of measuring the adhesive force thereof, it showed an adhesive force of 980 g/cm. An adhesive force after placing this in a constant-temperature and constant-humidity chamber of 80° C./90% RH for 168 hours was 860 g/cm.

[Comparative Example 1]

Polymerization was conducted in the same procedure as in Example 1 and Example 3 except that TDI was used as the monomer. That is, 5.0 g (29 mmols) of TDI, 25 ml of THF and 43.0 mg (0.22 mmol) of a carbodiimidization catalyst (3-methyl-1-phenyl-2-phospholene-1-oxide) were placed in a flask (100 ml). The mixture was stirred at 60° C. for 15 hours, and a polycarbodiimide solution having Mn=6,700 was obtained. The varnish was cast on a glass plate and dried at 90° C. for 30 minutes to prepare a film. The heat-curing temperature of the film was 350° C., and when the film was heat-treated at 200° C. for 1 hour, the film was discolored, lost the flexibility, and lost the self-supporting property.

[Comparative Example 2]

The varnish prepared in Comparative Example 1 was coated on a copper foil of 35 μm in thickness and dried at 90° C. for 30 minutes to prepare an adhesive sheet. When the adhesive force was measured using this adhesive sheet in the same manner as in Example 2, it initially showed an adhesive force of 600 g/cm, but when the sheet was placed in a constant-temperature and constant-humidity chamber of 80° C./90% RH, the adhesive sheet showed separation.

INDUSTRIAL APPLICABILITY

The resin composition of the present invention is easily soluble in general organic solvents and also the molding workability thereof is easy. Further, the glass transition temperature is low and thus a low-temperature workability is improved. Furthermore, the resin composition has a good adhesion to adherends such as semiconductor elements, has a low hygroscopic property and is excellent in the storage stability, and can be stored for a long period of time at normal temperature. Also, even when the resin composition is heat treated at 200° C. or more, it has a flexibility, thus having excellent heat resistance. Furthermore, in the case of the polymer wherein the polymer chain is bonded at the m-position, the glass transition temperature of the polymer is further low and the low-temperature workability is improved.

We claim:

1. An aromatic polycarbodiimide having a structural repeating unit represented by the following formula (I):

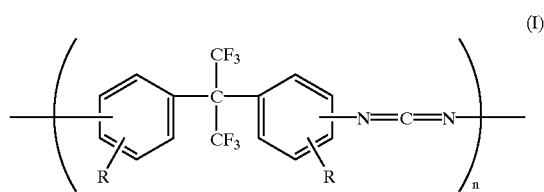

wherein R represents a hydrogen atom or an alkyl group and n is an integer of 3 to 600.

2. The aromatic polycarbodiimide as claimed in claim 1, having a structural repeating unit represented by the following formula (Ia) or (Ib):

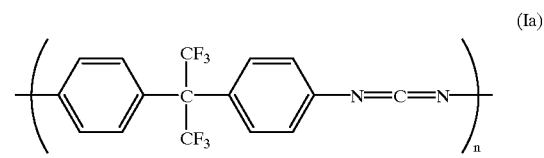

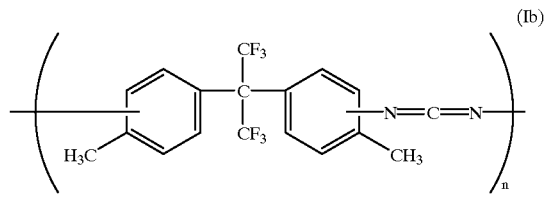

wherein n is an integer of 3 to 600.

3. A polycarbodiimide solution comprising a solution of the aromatic polycarbodiimide as claimed in claim 1 dissolved in an organic solvent.

4. A polycarbodiimide film comprising the aromatic polycarbodiimide as claimed in claim 1.

5. A polycarbodiimide adhesive sheet comprising the aromatic polycarbodiimide as claimed in claim 1.

* * * * *